United States Patent Office 3,126,405
Patented Mar. 24, 1964

3,126,405
PROCESS FOR PREPARING ORGANIC SULFUR ESTER COMPOUNDS
Giuseppe Losco and Giorgio Rossi, Milan, Italy, assignors to Montecatini Società Generale per l'Industria Mineraria e Chimica, Milan, Italy
No Drawing. Filed July 17, 1959, Ser. No. 827,692
Claims priority, application Italy July 21, 1958
6 Claims. (Cl. 260—455)

The present invention relates to esters of an organic aliphatic or aromatic acid with an alkylxanthoyl carbinol or with a dialkyl-dithiocarbamyl carbinol.

It particularly relates to the preparation of a group of organic sulfur compounds having the general formula

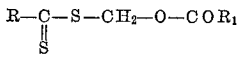

in which R is a methoxyl, ethoxyl, isopropoxyl or a dimethylamino or diethylamino group, while $R_1$ is a methyl or phenyl radical.

These substances can be prepared easily by reacting either a metal alkylxanthate having the general formula

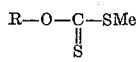

in which R is a preferably methyl, ethyl or isopropyl, and Me is a metallic element, such as sodium or potassium; or by reacting metal dialkyldithiocarbamate having the general formula

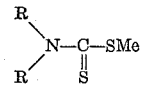

in which R is methyl or ethyl and Me is a metallic element, such as sodium or potassium, each being reacted with a mono-halomethyl ester of acetic or benzoic acid of the formula $$R_1\text{—COOCH}_2Y$$

in which $R_1$ is methyl or phenyl and Y is a halogen atom, such as chlorine, bromine, and iodine.

The reaction is generally carried out in the presence of an inert solvent capable of dissolving one or both reactants. As solvents, monohydric alcohols, ketones or their mixtures may be used. The most suitable temperatures may vary within fairly wide limits, e.g. from 10° to 80° C. The duration of the reaction varies from 1 to 16 hours. It is convenient, sometimes, to use an excess of one of the two reactants over the stoichiometric amount.

The metal halide formed as a byproduct of the reaction can be eliminated by filtering or by adding water. In the latter case the inorganic salt and the excess, if any, of organic salt are dissolved, there occurring also the contemporaneous precipitation of the desired product. The main reaction product can also be isolated by other known methods, such as concentration, distillation, and crystallization.

The substances of the present invention are, in general, liquids which are distillable under reduced pressure, or they are crystalline solids. They display fungicidal activity, as shown by laboratory tests carried out on micelia of *Alternaria tenuis* Nees, *Aspergillus niger* Thiegh, *Penicillium roqueforti* Thom, *Saccaromyces ellypsoideus* Hansen and on conidia of *Erisiphe cichoriacearum* D.C.

The following are examples of preferred embodiments of the invention:

EXAMPLE 1

27 g. of chloromethyl acetate are added to a suspension of 40 g. of potassium ethylxanthate in 150 cc. of anhydrous ethyl alcohol, while cooling with ice cold water so that the temperature of the reacting mass is not higher than 25° C. When the addition is completed, agitation is continued for 3 hours at 20–25° C. and the mixture is then refluxed on a water bath for 1 hour. The potassium chloride formed is then removed by filtration and the liquid is concentrated under reduced pressure. The residue is treated with 100 cc. of ethyl ether and washed with water. The ether extract brought to dryness gives 29 g. of an oily yellow liquid consisting of ethylxanthoylcarbinol acetate. The substance can be obtained in the pure state by distillation under reduced pressure. Boiling point 84°–85° C. under 0.15 mm. Hg: S found=32.9–32.9%; S theoretical=33.01%.

The reaction is formulated as follows:

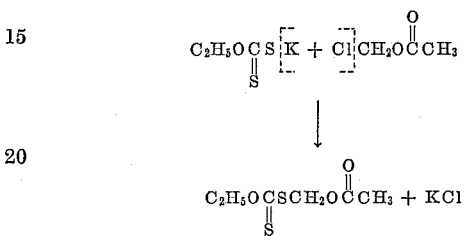

EXAMPLE 2

11.5 g. of metallic sodium and, subsequently, 30 ml. of carbon disulphide are added to 200 ml. of anhydrous methanol. 54 g. of chloromethyl acetate are added to the sodium methylxanthate solution thus obtained; the temperature rises spontaneously to about 45° C. The mixture is heated on a water-bath for 30 minutes and, after cooling, sodium chloride is eliminated by filtration. The filtrate is concentrated under reduced pressure and the residue is treated with 150 ml. of ethyl ether. The ether solution, after washing with water, is dried on $Na_2SO_4$ and then concentrated to dryness.

58 g. of methylxanthoylcarbinol acetate of the formula

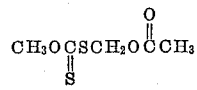

are obtained in the form of a slightly straw-yellow oil. The product can be obtained in the pure state by distillation under high vacuum. Boiling point 81–83° C. under 0.1 mm. Hg: S found=36.0%–35.7%, S theoretical=35.58%.

EXAMPLE 3

25 g. of chloromethyl acetate are added to a suspension of 40 g. of sodium diethyldithiocarbamate in 150 ml. of acetone; the temperature rises spontaneously to about 40° C. The mixture is refluxed on a water bath for 1 hour and is then cooled; the salt formed is filtered off. The liquid thus obtained is concentrated under reduced pressure and treated with 150 ml. of ethyl ether. By operating as indicated in Example 2, 36 g. of diethyldithiocarbamylcarbinol acetate are obtained in the form of a slightly yellow viscous liquid. This product can be purified by distillation under high vacuum. Boiling point 121–122° C. under 0.1 mm. Hg: S found=29.2–29.1%; S calculated=28.97%. N found=6.46%. N calculated=6.32%.

This reaction is formulated as follows:

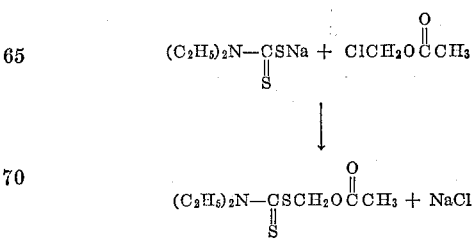

EXAMPLE 4

34 g. of chloromethyl benzoate are added to a suspension of 32 g. of potassium ethylxanthate in 200 ml. of acetone while stirring. The reaction is slightly exothermic. The whole is agitated for 16 hours and is then heated to the boiling point for 30 minutes. After cooling, the mixture is poured into 300 ml. of water. The oil thus formed is separated and kept under vacuum (15 mm. Hg) at about 40° C. until its weight is constant.

43 grams of ethylxanthoylcarbinol benzoate of the formula

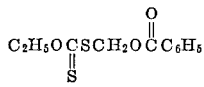

are obtained as a straw-yellow liquid. S found=24.6–24.5%. S calculated=25.01%.

EXAMPLE 5

17 g. of chloromethylbenzoate are added to a suspension of 20.6 of sodium isopropylxanthate in 150 ml. of acetone while stirring. By operating as indicated in Example 4, 22 g. of isopropylxanthoylcarbinol benzoate of the formula

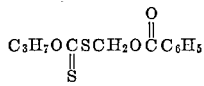

are obtained in the form of a straw-yellow liquid. S found=22.81–23.13%. S calculated=23.72%.

EXAMPLE 6

17 g. of chloromethylbenzoate are added to a suspension of 16.9 g. of monohydrate sodium dimethyldithiocarbamate in 100 ml. of acetone while stirring. The reaction is exothermic. The mixture is kept at 40–45° C. for 2 hours and, after cooling, the whole is poured into 300 ml. of water. A bulky solid product is formed which is collected on a Buchner filter and thoroughly washed with water. After drying, 24.5 g. of dimethyldithiocarbamylcarbinol benzoate are obtained.

The substance can be obtained in the pure state by crystallization from methanol. Melting point, 86.5° to 87.5° C.

EXAMPLE 7

17 g. of chloromethyl benzoate are added to a suspension of 18.8 g. of sodium diethyldithiocarbamate in 150 ml. of acetone while stirring. After 2 hours the mixture is refluxed for 1 hour and, after cooling, is filtered to remove sodium chloride. The liquid is concentrated under reduced pressure and then mixed with 100 ml. of ethyl ether. The ether solution, after washing with 100 ml. of water and subsequent dehydration on $Na_2SO_4$, is evaporated.

23 g. of a straw-yellow oil are obtained. The oil is easily solidified in the form of coarse crystals, which are pressed on a porous diaphragm in order to eliminate any traces of oily substances.

By crystallization from methanol, diethyldithiocarbamylcarbinol benzoate, of the formula

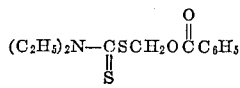

is obtained in the shape of crystals having a melting point of 50–51° C. S found=22.6%. S calculated=22.62%.

EXAMPLE 8

90 g. of dimethyl dithiocarbamylcarbinol benzoate (Example 6) mixed with 6.8 g. of lignin sulphite, 3 g. of expanded silica, 0.15 g. of kieselguhr and 0.05 g. of wetting agent obtained by condensation of ethylene oxide, give a preparation which can be dispersed in water and is suited for nebulization on plants.

EXAMPLE 9

50 g. of diethyldithiocarbamylcarbinol benzoate (Example 7) mixed with 40 g. of kieselguhr, 2 g. of expanded silica and 8 g. of lignin sulphite give a preparation suited for uses analogous to those mentioned in Example 8.

EXAMPLE 10

A 0.05% aqueous dispersion of the preparation of Example 8 applied by nebulization under standard conditions onto young kidney-bean plants grown in pots under artificial light, inhibited blight (*Uromyces appendiculatus*) with which they were infected after complete drying of the film of product.

EXAMPLE 11

A 0.05% aqueous dispersion of the preparation of Example 8, applied by nebulization onto young tobacco plants grown in pots under artificial light, inhibited the oidium (*Erysiphe cichoracearum*) with which they were infected under conditions analogous to those of Example 10.

EXAMPLE 12

A 0.002% aqueous dispersion of the preparation of Example 8, applied by nebulization under standard conditions on grapevine leaves placed on a Petri dish, inhibited the development of peronospora (*Plasmofora viticola*) infection seeded after complete drying of the film of the product.

EXAMPLE 13

A 0.005% aqueous dispersion of the preparation of Example 9 employed by the technique of Example 12, inhibited the growth of peronospora (*P. viticola*).

EXAMPLE 14

A 0.05% aqueous dispersion of the preparation of Example 9, employed by the technique of Example 11, inhibited growth of oidium (*E. cichoracearum*) on tobacco.

EXAMPLE 15

A 0.1% aqueous dispersion of the preparation of Example 9, employed by the technique of Example 10, inhibited growth of blight (*U. appendiculatus*) on kidney bean.

The fungicidal activity of the products according to the invention is illustrated by the following results obtained by standard laboratory methods:

(a) *Evaluation of the capacity of the products to inhibit growth and diffusion of fungine mycelium, after absorption on filter paper, evaporation of the solvent, resolubilization and diffusion on nutritive agar-agar.*—By this technique, small filter-paper disks with 1 cm. diameter, impregnated with the solutions of the products under examination are placed on the agar-agar coated surface of Petri dishes seeded with the test fungi. After incubation in a thermostat for 72 hours the haloes of inhibition of fungine growth around those disks are determined, and expressed in mm. The known fungicide, sodium pentachlorophenate, was taken as a reference for comparison. The results are classified as follows:

0=inhibition halo with diameter less than 1 mm.
1=inhibition halo with diameter less than 1–2 mm.
2=inhibition halo with diameter less than 3–4 mm.
3=inhibition halo with diameter less than 5–7 mm.
4=inhibition halo with diameter less than 8–11 mm.
5=inhibition halo with diameter less than 12–15 mm.
6=inhibition halo with diameter less than 16–20 mm.
7=inhibition halo with diameter less than 21–25 mm.
8=inhibition halo with diameter greater than 25 mm.

TABLE 1

| Product | Dose, Percent | Altern. tenuis | Asperg. niger | Penicil. roquef. | Sac. ell. |
|---|---|---|---|---|---|
| Ethylxanthoylcarbinol acetate (Ex. 1) | 1 | 8 | 8 | 8 | 8 |
|  | 0.2 | 8 | 8 | 8 | 3 |
|  | 0.04 | 3 | 0 | 0 | 0 |
| methylxanthoylcarbinol, acetate (Ex. 2) | 1 | 8 | 8 | 8 | 8 |
|  | 0.2 | 8 | 8 | 8 | 1 |
|  | 0.04 | 2 | 0 | 3 | 1 |
| dimethyldithiocarbamylcarbinol benzoate (Ex. 6) | 1 | 3 | 2 | 4 | 0 |
|  | 0.2 | 3 | 2 | 4 | 0 |
|  | 0.04 | 2 | 2 | 4 | 0 |
| diethyldithiocarbamylcarbinol acetate (Ex. 3) | 1 | 4 | 3 | 4 | 0 |
|  | 0.2 | 3 | 1 | 1 | 0 |
|  | 0.04 | 0 | 0 | 0 | 0 |
| ethylxanthoylcarbinol benzoate (Ex. 4) | 1 | 1 | 1 | 1 | 0 |
|  | 0.2 | 1 | 1 | 1 | 0 |
|  | 0.04 | 1 | 0 | 0 | 0 |
| isopropylxanthoylcarbinol benzoate (Ex. 5) | 1 | 1 | 1 | 1 | 0 |
|  | 0.2 | 1 | 0 | 0 | 0 |
|  | 0.04 | 1 | 0 | 0 | 0 |
| sodium pentachlorophenate | 1 | 8 | 7 | 7 | 5 |
|  | 0.2 | 6 | 6 | 6 | 4 |
|  | 0.04 | 4 | 5 | 3 | 1 |

(b) *Evaluation of the capacity of the products to inhibit growth and diffusion of fungine mycelium according to the porcelain cup method.*—The cup method differs from the aforementioned method only in the use of a porcelain cup containing a constant dose of solution of the product to be examined, in lieu of small paper disks. Sodium pentachlorophenate was taken as a reference comparison. The results obtained are classified by indexes as hereinbefore defined.

TABLE 2

| Product | Dose, Percent | Altern. tenuis | Asperg. niger | Penicil. roquef. | Sac. ell. |
|---|---|---|---|---|---|
| Ethylxanthoylcarbinol acetate (Ex. 1) | 1 | 8 | 8 | 8 | 8 |
|  | 0.2 | 8 | 8 | 8 | 0 |
|  | 0.04 | 6 | 0 | 0 | 0 |
| methylxanthoylcarbinol acetate (Ex. 2) | 1 | 8 | 8 | 8 | 7 |
|  | 0.2 | 8 | 8 | 8 | 2 |
|  | 0.04 | 3 | 1 | 8 | 1 |
| dimethyldithiocarbamylcarbinol benzoate (Ex. 6) | 1 | 2 | 2 | 1 | 0 |
|  | 0.2 | 1 | 2 | 2 | 0 |
|  | 0.04 | 1 | 1 | 1 | 0 |
| diethyldithiocarbamylcarbinol acetate (Ex. 3) | 1 | 5 | 4 | 4 | 0 |
|  | 0.2 | 3 | 2 | 2 | 0 |
|  | 0.04 | 0 | 0 | 0 | 0 |
| ethylxanthoylcarbinol benzoate (Ex. 4) | 1 | 4 | 4 | 4 | 0 |
|  | 0.2 | 2 | 1 | 4 | 0 |
|  | 0.04 | 2 | 1 | 1 | 0 |
| isopropylxanthoyl carbinol benzoate (Ex. 5) | 1 | 2 | 2 | 1 | 1 |
|  | 0.2 | 1 | 0 | 0 | 0 |
|  | 0.04 | 1 | 0 | 0 | 0 |
| sodium pentachlorophenate | 1 | 8 | 7 | 8 | 5 |
|  | 0.2 | 7 | 6 | 7 | 4 |
|  | 0.04 | 4 | 5 | 5 | 1 |

(c) *Evaluation of the capacity to inhibit germination and growth of fungine mycelium, of the products incorporated in the nutritive agar-agar (streak method).*—The streak method allows the examination of products hardly diffusible in solid agar-agar. By this method, the solution of the product is incorporated in the nutritive substrate, while the inoculation of the test fungus is carried out by means of streaks with suspensions of spores. The reading of the plates is carried out after 72 hours and the growth of the fungi is evaluated by indexes defined as follows:

0—no difference in respect of water as a control
1—slight difference in respect of water as a control
2—colonies spread through the whole streak
3—some colonies at a single point of the streak
4—fungine growth lacking The results of the evaluation of some products and of sodium pentachlorophenate are reported in Table 3.

TABLE 3

| Product | Dose, Percent | Altern. tenuis | Asperg. niger | Penicil. roquef. | Sac. ell. |
|---|---|---|---|---|---|
| Ethylxanthoylcarbinol acetate (Ex. 1) | 0.2 | 4 | 4 | 4 | 4 |
|  | 0.04 | 4 | 4 | 4 | 4 |
|  | 0.008 | 4 | 4 | 4 | 0 |
| methylxanthoylcarbinol acetate (Ex. 2) | 0.2 | 4 | 4 | 4 | 4 |
|  | 0.04 | 4 | 4 | 4 | 4 |
|  | 0.008 | 4 | 4 | 4 | 2 |
| dimethyldithiocarbamylcarbinol benzoate (Ex. 6) | 0.2 | 4 | 4 | 4 | 1 |
|  | 0.04 | 4 | 4 | 4 | 0 |
|  | 0.008 | 2 | 2 | 3 | 0 |
| diethyldithiocarbamyl carbinol acetate (Ex. 3) | 0.2 | 4 | 4 | 4 | 4 |
|  | 0.04 | 4 | 2 | 1 | 1 |
|  | 0.008 | 3 | 1 | 1 | 0 |
| ethylxanthoylcarbinol benzoate (Ex. 4) | 0.2 | 4 | 4 | 4 | 0 |
|  | 0.04 | 4 | 4 | 4 | 0 |
|  | 0.008 | 4 | 3 | 4 | 0 |
| isopropylxanthoylcarbinol benzoate (Ex. 5) | 0.2 | 2 | 2 | 3 | 0 |
|  | 0.04 | 2 | 2 | 2 | 0 |
|  | 0.008 | 1 | 1 | 1 | 0 |
| sodium pentachlorophenate | 0.2 | 4 | 4 | 4 | 4 |
|  | 0.04 | 4 | 4 | 4 | 4 |
|  | 0.008 | 3 | 1 | 3 | 1 |

(d) *Evaluation of anti-oidial activity.*—The method used for evaluating anti-oidial activity consists in nebulizing under standard conditions aqueous dispersions of the products to be tested onto small tobacco plants of the "Virginia bright" variety bred under standard conditions. When the nebulized product deposited thereon has become completely dry, the test plants are infected by slight rubbing with leaves covered with oidium (*Erisiphe cichoriacearum*). The determination of the infection is carried by estimating the percent proportion of leaf surface area covered with oidium about 15 days after treatment and by comparing it with the infection of untreated controls. The following 5 classes of degrees of intensity of infection were thus established, in growing order of concession:

1=no infection
2=considerable reduction of infection as compared with the untreated control (10–20% against 70–90%)
3=evident reduction of infection as compared with the untreated control (30–40% against 70–90%)
4=slight reduction of infection as compared with the untreated control (50–60% against 70–90%)
5=infection as in the untreated control.

A sample of commercial colloidal sulfur was used as reference of comparison.

TABLE 4

| Product | Dose, percent | Results obtained after 15 days |
|---|---|---|
| Dimethyldithiocarbamylcarbinol benzoate (Ex. 6) | 0.025 | 1 |
|  | 0.0125 | 2 |
|  | 0.006 | 2 |
| diethyldithiocarbamylcarbinol benzoate (Ex. 7) | 0.025 | 1 |
|  | 0.0125 | 2 |
|  | 0.006 | 4 |
| colloidal sulfur | 0.025 | 1 |
|  | 0.0125 | 2 |
|  | 0.006 | 2 |

The products of the present invention are distinguished by low toxicity for warmblooded animals.

Table 5 presents toxicity data on preferred species of the products.

TABLE 5

| Test on white mouse | Dose administered per os | Mortality, percent | Dose administered by intravenous injection, mg./kg. | Mortality, percent |
|---|---|---|---|---|
| Ethylxanthoylcarbinol acetate (Ex. 1). | 653 mg./kg | 50 | 149 | 50 |
| methylxanthoylcarbinol acetate (Ex. 2). | 556 mg./kg | 50 | 162 | 50 |
| Dimethyl+dithiocarbamylcarbinol benzoate (Ex. 6). | 600 mg./kg | 0 | 150 | 0 |
| diethyldithiocarbamylcarbinol benzoate (Ex. 7) | 1 g./kg | 0 | 250 | 0 |

The data presented above for the compositions, found in Examples 8 and 9, and for the methods of employment and the activity of the compositions on plants, found in Examples 10 to 15, are not to be taken as limitative, since other carriers, dispersants and methods of application will now be obvious to persons skilled in the art.

We claim:

1. Ethylxanthoylcarbinol acetate, of the formula:

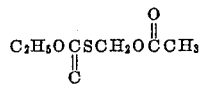

2. Methylxanthoylcarbinol acetate, of the formula:

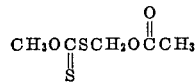

3. Dimethyldithiocarbamylcarbinol benzoate, of the formula:

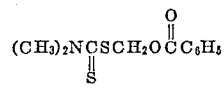

4. Diethyldithiocarbamylcarbinol benzoate, of the formula:

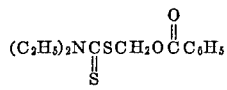

5. Ethylxanthoylcarbinol benzoate, of the formula:

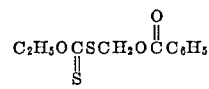

6. Isopropylxanthoylcarbinol benzoate, of the formula:

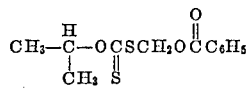

References Cited in the file of this patent

UNITED STATES PATENTS

| 2,320,287 | Lieber et al. | May 25, 1943 |
| 2,396,789 | Hunt | Mar. 19, 1946 |
| 2,474,839 | Gresham et al. | July 5, 1949 |
| 2,765,254 | Somerville | Oct. 2, 1956 |

FOREIGN PATENTS

| 551,380 | Italy | Mar. 27, 1956 |